June 10, 1924.
G. C. STRONG
1,497,608
AUTOMOBILE SAFETY PASSING LIGHT
Filed June 16, 1923
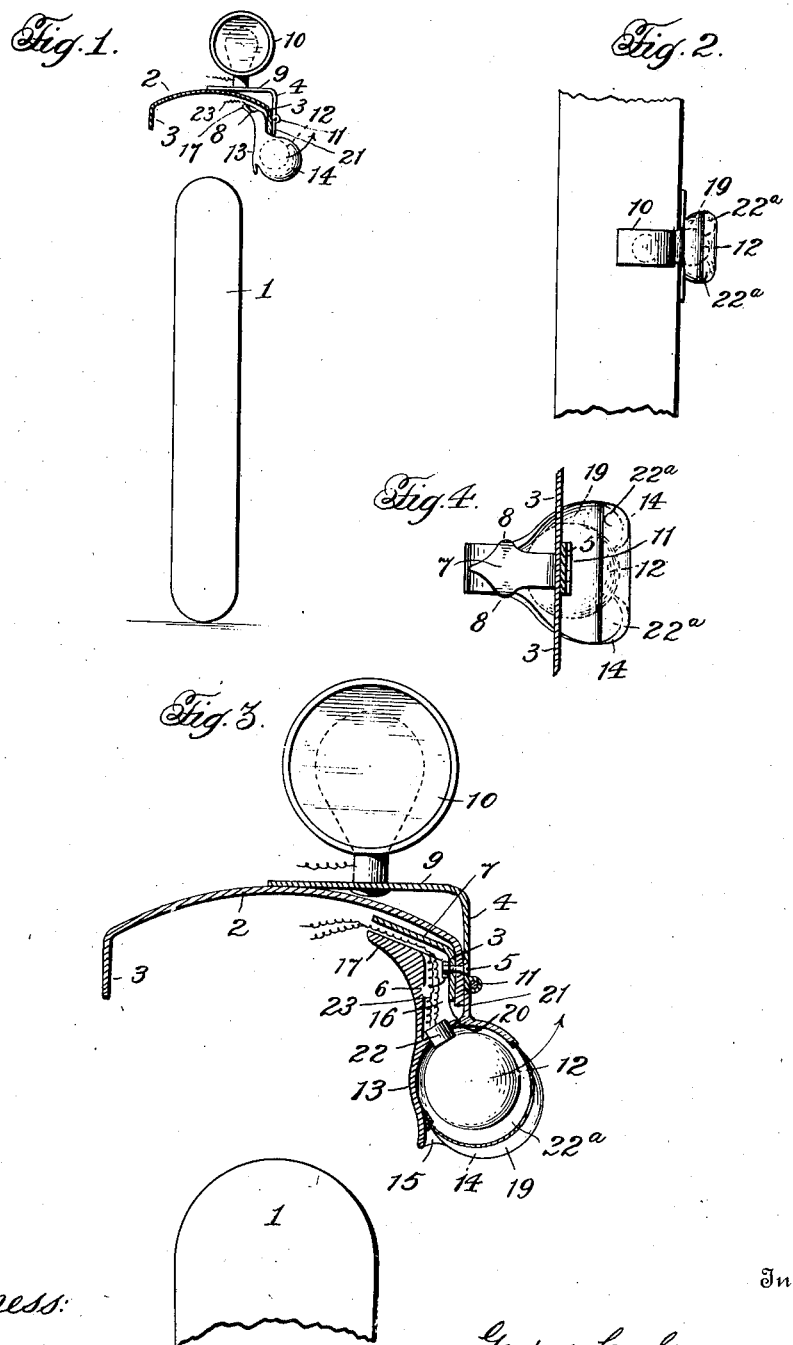

Patented June 10, 1924.

1,497,608

UNITED STATES PATENT OFFICE.

GEORGE C. STRONG, OF NORFOLK, VIRGINIA.

AUTOMOBILE SAFETY PASSING LIGHT.

Application filed June 16, 1923. Serial No. 645,874.

*To all whom it may concern:*

Be it known that I, GEORGE C. STRONG, a citizen of the United States, residing at Norfolk, in the county of Norfolk and State of Virginia, have invented certain new and useful Improvements in Automobile Safety Passing Lights, of which the following is a specification, reference being had therein to the accompanying drawing.

My invention relates to new and useful improvements in an automobile safety passing light and more particularly to a light adapted to be secured to the forward left hand fender or mud guard of an automobile so as to direct rays of light towards the front left wheel and the ground adjacent thereto so that the operator of an approaching automobile may easily see the position of that automobile which he is approaching and pass the same at a sufficient distance for safety.

The principal object of the invention resides in the provision of a light, for the above purpose, which will be secured to the fender or mud guard to normally extend substantially vertically to a position adjacent the outer face of the forward left hand wheel but which may be swung in substantially horizontal position when it is desired to change tires or to remove the wheel.

Another object of the invention consists in the formation of the reflector or light guard in such a manner as to protect the light bulb against damage by mud or stones thrown by the wheel in travel.

A further object of the invention resides in the provision of novel means for securing the light to the fender or mud guard, said means including a spring catch or clamp adapted for normally holding the light in substantially vertically extending position and a support for a mirror and warning sign said warning sign being lighted, the light being turned on and off preferably by the same switch that operates the main light.

With the above and other objects in view, which will appear as the description proceeds, my invention consists in the novel details of construction and arrangement of parts described in the following specification and illustrated in the accompanying drawings, and while I have illustrated and described the preferred embodiments of the invention, as they now appear to me, it will be understood that such changes may be made as will fall within the scope of the appended claims.

In the drawings:

Fig. 1 is a transverse vertical section through a fender or mud guard and my passing light with parts shown in elevation.

Fig. 2 is a fragmental top plan of a fender or mud guard with the passing light shown in top plan.

Fig. 3 is an enlarged transverse vertical section through a fender or mud guard and my passing light with parts shown in elevation, and Fig. 4 is a detail sectional view showing the mud guard flange and mirror and warning sign supporting plate in section and a top plan of the reflector and holding clamp therefor.

In the drawings 1 indicates the forward left hand wheel of an automobile and 2 the fender or mud guard extending thereover, said mud guard having the usual downwardly extending vertical flange 3 formed on the outer longitudinal edge. My improved light comprises a plate 4 which engages the outer face of the flange 3, as shown, and is adapted to be secured thereto by means of the bolts 5 and nuts 6 said bolts and nuts also securing, to the inner face of the flange 3, the spring catch or clamp 7 which extends under the fender or mud guard, as more clearly illustrated in Figs. 1 and 3, and the side edges of which are curved downwardly as shown at 8 to engage a portion of the light guard or reflector in a manner as will be later described. The plate 4 is provided at the upper end with the inwardly extending arm or projection 9 which, as shown, extends over the upper surface of the fender or mud guard and is adapted to support a combined mirror and warning sign 10, the mirror portion being directed towards the operator of the automobile and the warning portion, preferably in the form of a skeleton and cross bones towards the front of the machine and towards the operator of an approaching machine. The combined mirror and warning sign is preferably of a construction to receive a light for illuminating the warning sign, said light preferably being operated by the same switch or mechanism that operates the main light.

Hingedly connected at 11 to the lower edge of the plate 4 is the reflector or guard which carries the incandescent bulb 12, said reflector or guard comprising a rear wall or plate 13 and the outwardly directed flared side walls or wings 14, these side walls or wings extending above, below, and outwardly beyond the bulb 12 so as to protect the same against dirt or stones thrown by the automobile wheel in travel. As is quite clearly shown in Fig. 3 of the drawings the rear wall or plate 13 terminates above the lower end of the side walls or wings 14 so as to leave the space 15 so that the rays of light from the bulb 12 may be directed not only towards the ground adjacent the wheel but also inwardly towards the outer face of the wheel. The rear wall or plate 13 is provided adjacent the upper end with the vertical extending side flanges 16 which extend towards the flange 3 of the fender or mud guard and will normally engage the vertical or perpendicular portion of the spring catch or clamp 7, as shown, and on the upper end is formed with the projection 17 which extends inwardly toward the center of the fender or mud guard and is adapted to be engaged by the spring catch or clamp 7, the downwardly curved side edges engage the side edges of the projection to normally hold the guard or reflector in substantially vertical position, and when the guard or reflector is swung into substantially horizontal position the points or projections 8, on the sides of the clamp or catch, will engage the upper surface of the projection 17. As is shown more particularly in Fig. 2 of the drawings the side walls or wings 14 are oppositely flared to provide the space 19, between the bottoms of said wings or side walls so that the rays of light will be directed towards the ground. Formed on the front wall of the plate 13 is the concavo-convex plate forming a pocket for the bulb 12. A flange 21 extends upwardly from the plate 20 and parallel with the flange 3. This flange 21 cooperates with the plate 4 to form means for hingedly connecting the reflector or guard at the point 11. The bulb 12 is connected to the plate 20 by the usual socket 22 and the wires 23, leading thereto, are protected, as shown, by being housed between the catch or clamp 7, the plate 13 and flanges 16, the flange 3, the plate 20, and the flange 21 formed on the plate 20. A cover glass 22ª is secured to the reflector, as shown, being positioned above the lower edges of the side walls or wings 14.

From the above detail description it is thought that the construction and manner of using my passing light will be clearly understood and it will be seen that the rays of light will be directed not only towards the ground, adjacent for front left hand wheel of an automobile, but certain portions thereof will also be directed towards the outer face of the wheel and the operator of an approaching vehicle may readily see the exact position of the automobile, which is approaching, and can steer his machine so as to pass the approaching machine at a safe distance. The guard or reflector carrying the light bulb is so shaped that any mud, stones or other material, thrown by the wheel in travel, will be deflected so as not to damage the light. The reflector or guard is normally held in a substantially vertical position by means of the spring clamp or catch 7 which holds the said reflector or guard against swinging movement on the hinge 11 but when it is desired to remove the tire or the entire wheel the spring clamp or clutch may be disengaged. With the clamp disengaged the reflector or guard may be swung, on the hinge 11, into substantially horizontal position, as indicated in dotted lines and may be held in said horizontal position by the points or projections 8 on the sides, engaging the upper face of the projection 17. With the reflector or guard in horizontal position the tire or wheel may be removed without interference. It will also be seen that I have provided means for supporting a mirror or warning signal, such means including the inwardly extending arm 9 on the upper end of the plate 4, said arm 9 extending over and engaging the upper surface of the fender or mud guard 2 as is quite clearly illustrated in the drawings. The same bolts and nuts will be used for securing the plate 4 and the spring clamp 7 to the downwardly extending flange 3 of the fender or mud guard.

Having fully described my invention what I claim as new and desire to secure by Letters Patent is:

1. In combination with the fender of an automobile or the like, a reflector pivotally connected to the fender for swinging movement, means engageable with the reflector for normally holding the same in substantially vertically extending position but allowing it to be swung into horizontal position, and a light bulb carried by the reflector.

2. In combination with the fender of an automobile or the like, a reflector pivotally connected to the fender for swinging movement, a clamp carried by the fender and adapted to engage the reflector to normally hold the same in vertically extending position but adapted to be swung into substantially horizontal position, and a light bulb carried by the reflector.

3. In combination with the fender of an automobile or the like, a reflector pivotally connected to the fender for swinging movement, a spring clamp carried by the fender and adapted to engage the upper end of the reflector to hold the same in substantially vertically extending position but allowing the same to be swung into substantially horizontal position, and a light bulb carried by the reflector.

4. In combination with the fender of an automobile or the like, a vertically extending plate connected to the fender, a light pivotally connected to the lower end of the plate, and a mirror and warning signal carried by the upper end of the plate.

5. In combination with the fender of an automobile or the like, a vertically extending plate connected to the fender, a light pivotally connected to the lower end of the vertically extending plate, an inwardly extending arm formed on the upper end of the plate, and a mirror and warning signal carried by the arm.

6. In combination with the fender of an automobile or the like having a downwardly extending longitudinal flange, a reflector connected to said flange for swinging movement, said reflector including a rear wall, outwardly extending side walls, a concavo-convex plate extending outwardly from the rear wall and forming a pocket to receive a light bulb to be positioned between the rear and side walls, and an upwardly extending flange on the outer edge of said concavo-convex plate adapted to extend parallel with the outer face of the flange of the fender, said flange on the plate forming means whereby the reflector may be connected to the fender.

7. In combination with the fender of an automobile or the like, a reflector pivotally connected to the fender, an extension formed on the reflector, a light bulb carried by the reflector, and means carried by the fender and engageable with the extension of the reflector for holding the reflector in position.

8. In combination with a fender of an automobile or the like, a reflector pivotally connected to the fender, an inwardly extending projection formed on the reflector and extending beneath the fender, a light bulb carried by the reflector, and means carried by the fender and engageable with the inwardly extending projection of the reflector for holding the reflector in position.

In testimony whereof I hereunto affix my signature in the presence of two witnesses.

GEORGE C. STRONG.

Witnesses:
 EURIC S. PETERS,
 MARGARET BROWN.